United States Patent [19]

Bourquin

[11] Patent Number: 4,546,796
[45] Date of Patent: Oct. 15, 1985

[54] APPARATUS FOR SUPPLYING GAS UNDER PRESSURE AND DISTRIBUTING IT BETWEEN N OUTLETS

[75] Inventor: Robert Bourquin, Valdieu-Lutran, France

[73] Assignee: Alsthom-Atlantique, Paris, France

[21] Appl. No.: 506,252

[22] Filed: Jun. 20, 1983

[30] Foreign Application Priority Data

Jun. 18, 1982 [FR] France ............................... 82 10642

[51] Int. Cl.⁴ ........................ F16K 11/07; F16K 47/00
[52] U.S. Cl. ................................ 137/625.48; 137/862; 137/625.3; 251/205; 138/43; 138/46
[58] Field of Search ............... 137/625.48, 872, 862, 137/625.3, 625.12; 251/205; 138/43, 46

[56] References Cited

U.S. PATENT DOCUMENTS

| | | | |
|---|---|---|---|
| 2,369,357 | 2/1945 | Kunz | 137/625.48 X |
| 2,637,985 | 5/1953 | Ray | |
| 2,764,181 | 9/1956 | Richolt | 137/625.40 X |
| 2,832,368 | 4/1958 | Freer | |
| 3,974,853 | 8/1976 | Bentley | 251/205 X |
| 3,985,336 | 10/1976 | Bentley | 251/205 |
| 4,164,962 | 8/1979 | Soderberg | 137/625.3 X |
| 4,319,608 | 3/1982 | Raikov et al. | 137/625.48 |

FOREIGN PATENT DOCUMENTS

| | | | |
|---|---|---|---|
| 479101 | 7/1929 | Fed. Rep. of Germany | 137/625.48 |
| 701212 | 1/1941 | Fed. Rep. of Germany | 137/625.48 |
| 1279049 | 11/1961 | France | 137/625.48 |

Primary Examiner—Arnold Rosenthal
Attorney, Agent, or Firm—Sughrue, Mion, Zinn, Macpeak and Seas

[57] ABSTRACT

Apparatus for supplying gas under pressure and distributing it between a plurality, n, of outlets (15) comprises a piston (1) slidably mounted in a cylinder (2), with the piston (1) being fixed to a rod (6) which serves to position the piston in the cylinder, and with the cylinder including a base (3) provided with a gas inlet (16) and a side wall (5) having n openings, each of which is connected to a corresponding gas outlet; said piston, when in a base end postion, serving to block communication between the inlet and the outlets; the improvement wherein the openings in the side wall are constituted by grooves (13) which extend over a shorter length than the axial extent of the piston, and whose depth in the thickness of the wall increases with distance from said base, the furthest end of each groove from said base being connected to an associated gas outlet, and each groove constituting together with the piston a convergent-divergent nozzle. The apparatus can be used to feed gas to the injectors in a gas turbine or to the burners in a boiler. Since the flow rate is determined solely by the pressure upstream from the nozzles and by the throat area of each nozzle, each of the outlets receives an amount of gas which is unaffected by flow conditions downstream from the outlets, e.g. varying amounts of dirt on the injectors.

2 Claims, 2 Drawing Figures

APPARATUS FOR SUPPLYING GAS UNDER PRESSURE AND DISTRIBUTING IT BETWEEN N OUTLETS The present invention relates to apparatus for supplying gas under pressure and distributing it between a plurality, n, of outlets. The apparatus comprises a piston slidably mounted in a cylinder, with the piston being fixed to a rod which serves to position the piston in the cylinder, and with the cylinder comprising a base provided with a gas inlet and a side wall having n openings, each of which is connected to a corresponding gas outlet, said piston, when in a base end position, serving to block communication between the inlet and the outlets.

BACKGROUND OF THE INVENTION

Such apparatus is described in U.S. Pat. No. 2,832,368, and may be used to supply fuel to n injectors, but when the fluid flow characteristics of each direction are not identical, e.g. unmatched pairs of burners, burners with differing degrees of dirt deposited on them, etc.. equal amounts of fuel are not delivered to each burner.

Preferred embodiments of apparatus in accordance with the invention enable gas to be more equally distributed.

SUMMARY OF THE INVENTION

The present invention provides apparatus for supplying gas under pressure and distributing it between a plurality, n, of outlets, the apparatus comprising a piston slidably mounted in a cylinder, with the piston being fixed to a rod which serves to position the piston in the cylinder, and with the cylinder including a base provided with a gas inlet and a side wall having n openings, each of which is connected to a corresponding gas outlet, said piston, when in a base end position, serving to block communication between the inlet and the outlets, the improvement wherein the openings in the side wall are constituted by grooves which extend over a shorter length than the axial extent of the piston, and whose depth in the thickness of the wall increases with distance from said base, the furthest end of each groove from said base being connected to an associated gas outlet, and each groove constituting together with the piston a convergent-divergent nozzle.

The flow through the throat of each nozzle (i.e. around a rounded base edge of the piston) is sonic, at least on starting and at low flow rates, in such a manner that the flow is equally distributed between the n outlets since the flow through the outlets depends only on the common pressure upstream of the throat and on the cross section of the throat which is the same for each nozzle.

Further, by giving the piston a long stroke, accuracy can be increased while wear is reduced.

In a preferred embodiment of the invention, the cylinder is provided with a cover and the piston which separates the cylinder into two chambers is provided with one or more holes putting said chambers into communication with each other, said piston being mounted on a rod which passes through the cover and through the base in sealed manner.

Pressures on the piston are thus in equilibrium and there is no net effect of the gas pressure on the piston. Further, movement of the piston has no transient effects on gas flow.

The apparatus may be used for a gas turbine having n combustion chambers. This requires the outlets from the apparatus to be connected to respective combustion chamber injectors.

The apparatus may also be used to supply fuel to n burners in a boiler.

BRIEF DESCRIPTION OF THE DRAWING

An embodiment of the invention is described by way of example with reference to the accompanying drawing, in which.

MORE DETAILED DESCRIPTION

Figure 1:
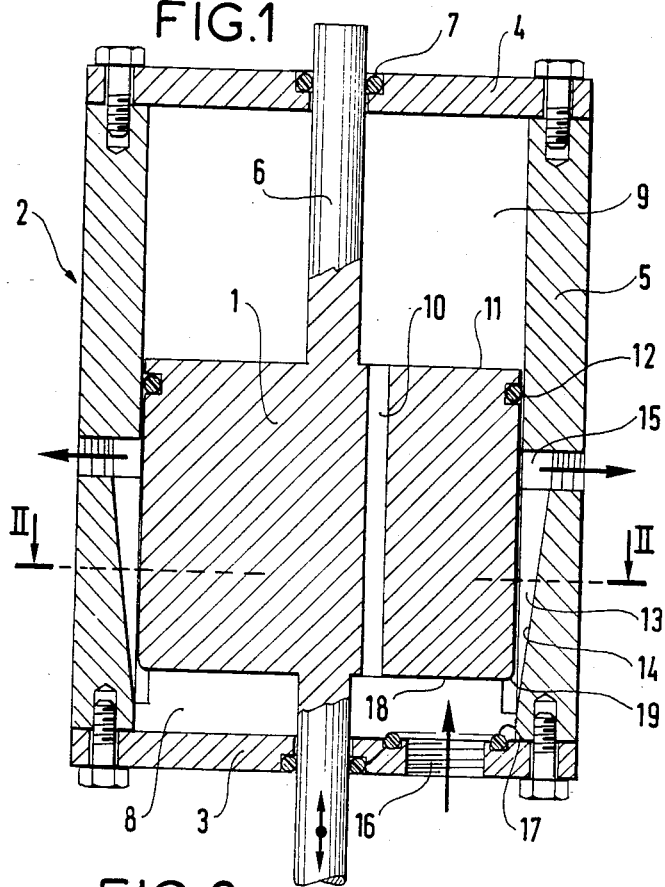
FIG. 1 is an axial section through apparatus in accordance with the invention.
Figure 2:
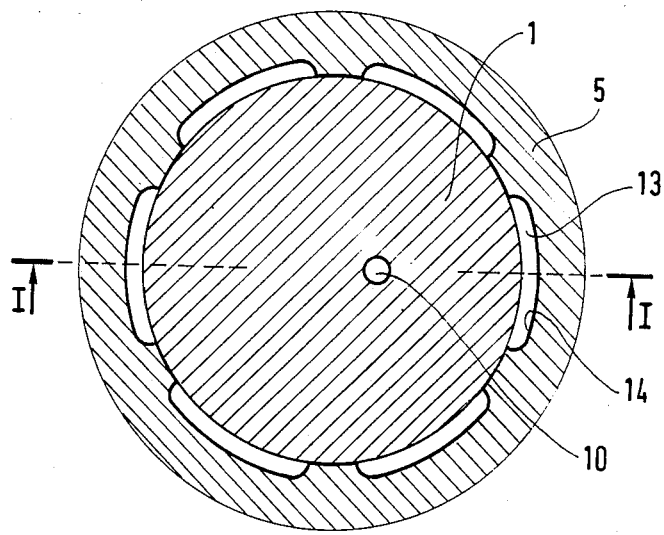
FIG. 2 is a cross section through the apparatus of FIG. 1 along a line II—II.

With reference to FIGS. 1 and 2, the apparatus comprises a piston 1 slidably mounted inside a cylinder 2. The cylinder 2 has a base 3, a cover 4 and a side wall 5.

The piston 1 is connected to a vertical rod 6 which passes through both the base 3 and the cover 4. Sealing means 7 are provided to prevent gas leaking out from the cylinder along the rod.

The piston 1 divides the cylinder 2 into two chambers 8 and 9 which communicate with each other via a hole 10 through the piston 1.

The top or cover end 11 of the piston is surrounded by a sealing ring 12. The inside surface of the cylinder side wall 5 has six grooves 13 extending axially part of the way from the base end. The grooves 13 are of constant width, but their floors 14 slope in such a manner that the grooves 13 get progressively deeper going a way from the base. The floors 14 are preferably flat.

The grooves 13 are shorter in the axial direction than the axial thickness of the piston 1. The deep end of each groove is fitted with an outlet 15.

The base has an inlet 16 for admitting gas under pressure. This inlet 16 is surrounded by a sealing ring 17.

When the piston 1 is at the base end, i.e. when the bottom surface 18 of the piston 1 is in contact with the base 3, there is no communication between the inlet 16 and any of the outlets 15.

The bottom edge 19 of the piston is rounded, and as the piston is moved away from the base, the rounded edge 19 cooperates with the grooves 13 to constitute a plurality of convergent-divergent nozzles.

The amount of gas admitted to each outlet 15 depends on how far the piston is moved.

At least when flow starts and during flow at low rates, the gas flow through the throats of the nozzles is sonic. At higher flow rates, it may be necessary to increase the inlet gas pressure if sonic speeds are to be maintained in the throats.

The amount of gas flowing out through each outlet 15 depends solely on the upstream pressure in the chamber 8 and on the cross section of the corresponding throat. These two flow rate determining factors are identical for all the outlets 15. It thus follows that the gas is evenly distributed between the outlets, since the pressure downstream from each outlet has no effect on the flow rate. The downstream pressures may vary, e.g. when the outlets are connected to injectors, only some of which are dirty.

When the sloping floors 14 of the grooves 13 are flat, the flow rate varies linearly with piston displacement.

The hole 10 ensures that gas pressure on either side of the piston is the same and that the piston is therefore not subjected to any net force by the gas.

Thus, when the rod 6 is actuated by a servo motor, there is no transient effect of gas pressure on the servo motor setting, and hence on the flow rate of gas delivered to the outlets 15.

Apparatus in accordance with the invention thus serves to distribute gas from a common inlet in a balanced manner to a plurality of outlets without factors downstream from the outlets having an adverse effect on the flow rates through particular outlets. Typically the outlets may be connected to the injectors of a gas turbine or to burners in a boiler.

I claim:

1. Apparatus for supplying gas under pressure and distributing it between a plurality, n, of outlets, the apparatus comprising a piston slidably mounted in a cylinder, a rod fixed to said piston which serves to position the piston axially in the cylinder, said cylinder including a base provided with a gas inlet underlying the piston, said cylinder having a side wall with n openings, each opening being connected to a corresponding gas outlet; said piston being sized such that, when in a base end position, it serves to block communication between the inlet and the outlets; the improvement wherein the openings in the cylinder side wall are constituted by longitudinal grooves internally of said side wall, which grooves extend over a shorter length than the axial extent of the piston, and whose radial depth in the thickness of the wall increases with distance from said base, the end of each groove remote from said base being connected to an associated gas outlet, and each groove constituting together with the piston, a convergent-divergent nozzle.

2. Apparatus according to claim 1, wherein the cylinder is provided with a cover and the piston which separates the cylinder into two chambers is provided with one or more holes putting said chambers into communication with each other, said piston being mounted on said rod such said rod passes through the cover and through the base in sealed manner.

* * * * *